United States Patent
Griffioen

[11] Patent Number: 5,884,384
[45] Date of Patent: *Mar. 23, 1999

[54] METHOD FOR INSTALLING A TUBE OR A BUNDLE OF TUBES IN AN EXISTING TUBULAR DUCT

[75] Inventor: Willem Griffioen, Ter Aar, Netherlands

[73] Assignee: Koninklijke KPN N.V., Groningen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 768,998

[22] Filed: Dec. 18, 1996

[30] Foreign Application Priority Data

Dec. 21, 1995 [NL] Netherlands ............... 1001960

[51] Int. Cl.⁶ .......................................... B23Q 3/00
[52] U.S. Cl. ................ 29/468; 29/464; 226/97.1; 254/134.4
[58] Field of Search ............. 29/464, 423, 455.1, 29/468, DIG. 63; 254/134.4; 226/97.1

[56] References Cited

U.S. PATENT DOCUMENTS

| | | | |
|---|---|---|---|
| 3,554,493 | 1/1971 | Bowden et al. | 254/134.4 |
| 4,185,809 | 1/1980 | Jonnes | 254/134.4 |
| 4,648,744 | 3/1987 | Knapp | 138/94 |
| 5,046,674 | 9/1991 | Kolschbach et al. | 254/134.4 |
| 5,308,041 | 5/1994 | Griffioen et al. | 254/134.4 |
| 5,311,954 | 5/1994 | Quintana | |

FOREIGN PATENT DOCUMENTS

| | | |
|---|---|---|
| 0 292 037 A1 | 11/1988 | European Pat. Off. . |
| 0 445 858 A1 | 9/1991 | European Pat. Off. . |
| 2600749 | 12/1987 | France . |
| 2660790 | 10/1991 | France . |
| 3304133 A1 | 10/1984 | Germany . |
| 0437709 A1 | 7/1991 | Germany . |
| 9210476 | 11/1992 | Germany . |

OTHER PUBLICATIONS

Installation Of Optical Cables In Duct, W. Griffioen, pp. 5–12 and 135–139, Cip–Gegevens Koninklijke Bibliotheek, Den Haag, Copyright 1993 by Plumettaz SA.

*Primary Examiner*—David P. Bryant
*Attorney, Agent, or Firm*—Frishauf, Holtz, Goodman, Langer & Chick

[57] ABSTRACT

A method for installing a tube or a bundle of tubes in an existing tubular conduit. The tube or tubes are passed into the existing tube by means of a fluid under pressure which is introduced into the existing tube at the inlet end. The tube or tubes can be open or closed at their forward end and are connected to a guide device and/or a pulling device. The existing tube can be open or closed at the end. With the method according to the invention, tubes can installed in an existing tube in a flexible and efficient manner, which tubes can be used for various purposes, for instance as an envelope of telecommunication cables.

16 Claims, 4 Drawing Sheets

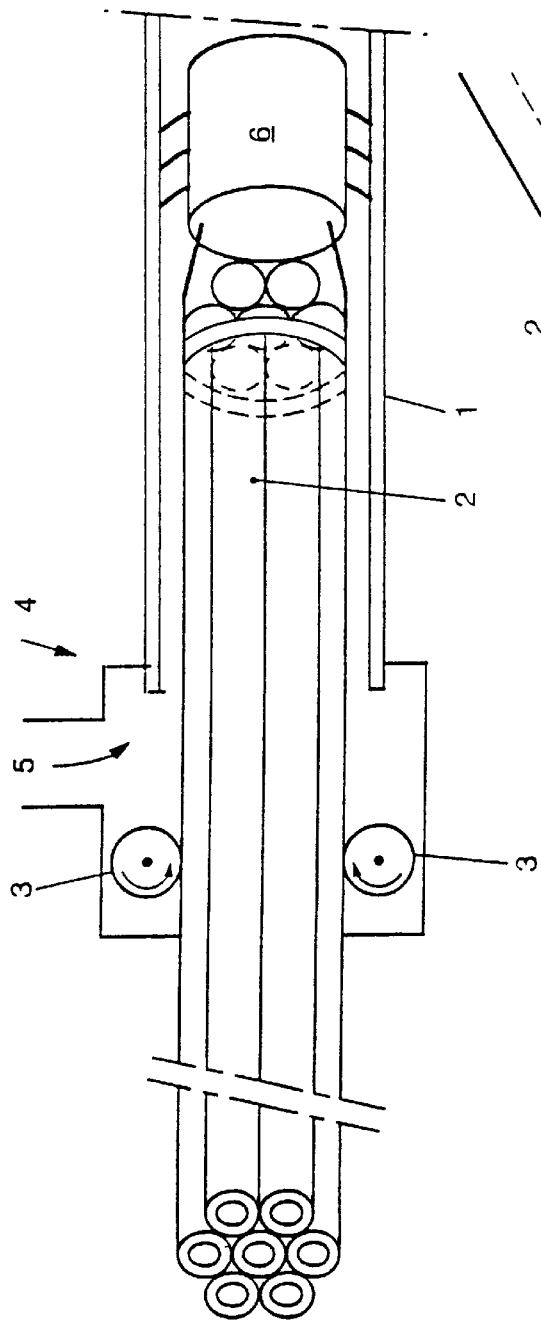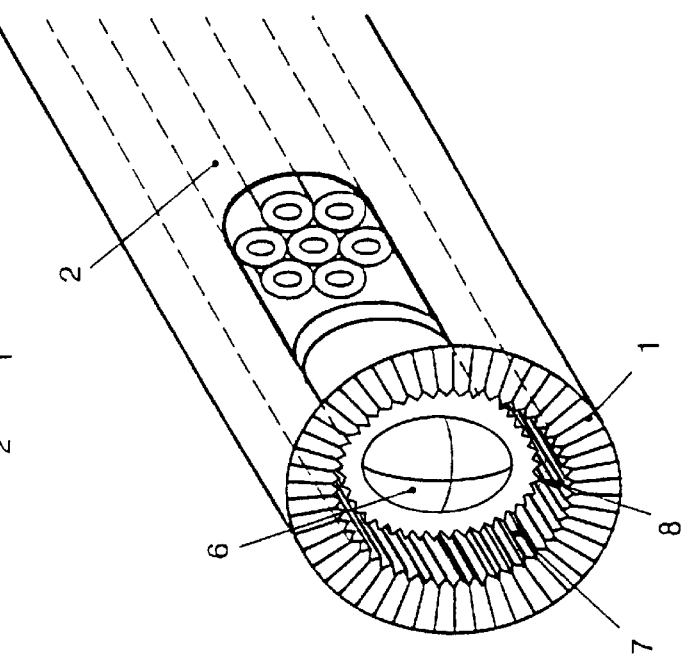

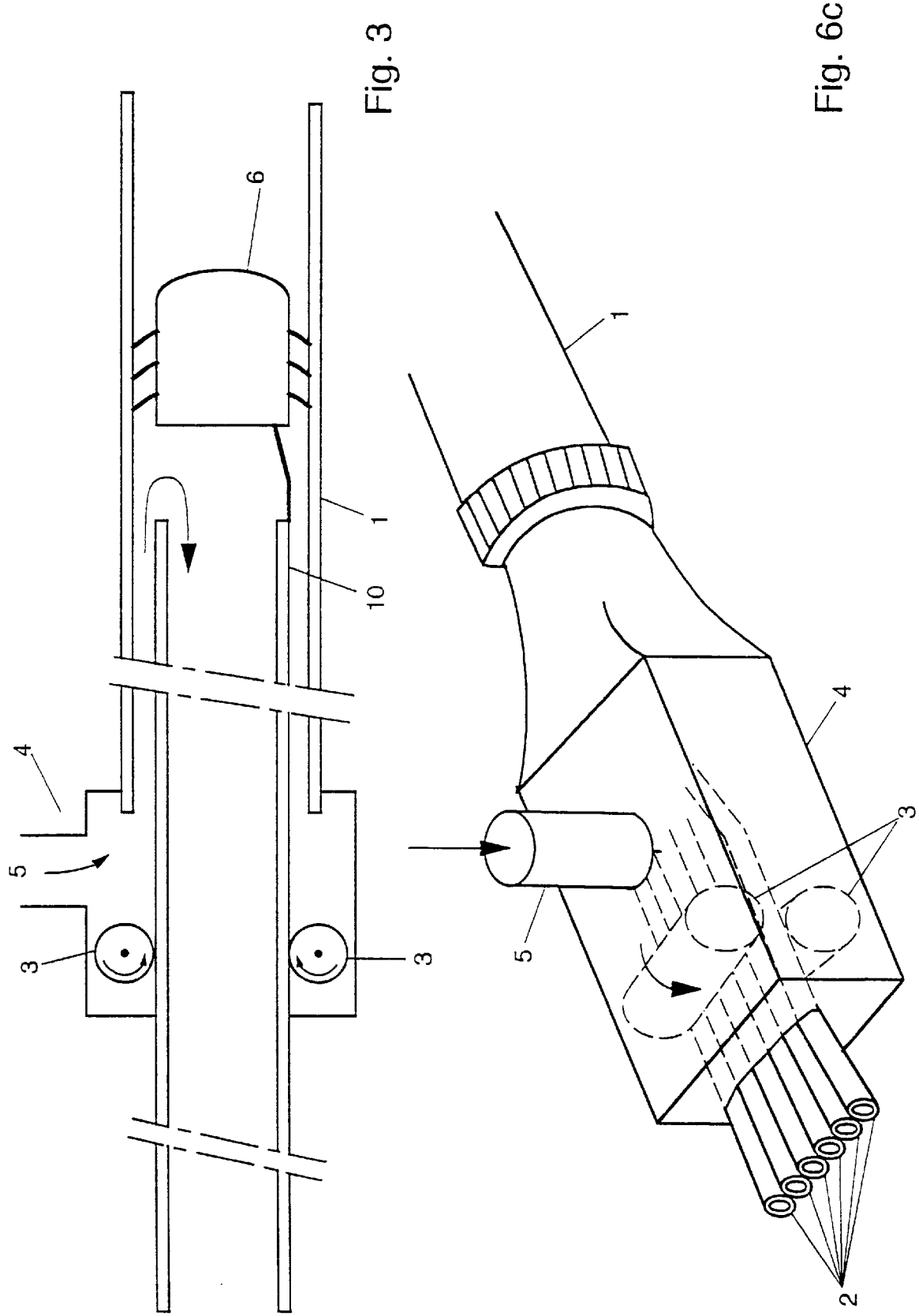

METHOD FOR INSTALLING A TUBE OR A BUNDLE OF TUBES IN AN EXISTING TUBULAR DUCT

The invention relates to a method for installing a tube or a bundle of tubes in an existing tubular duct. Installing a tube or a bundle of tubes in another tube can be desirable in a number of cases, for instance when installing tubes in which cables are laid, and also in water supply pipes or sewers.

BACKGROUND OF THE INVENTION

With tubular conduits in which cables are laid, so-called cable ducts, it may be desirable to install in an existing tube a second tube, whose interior has a low(er) coefficient of friction than the existing tube, so that a cable, optionally at a later time, can be pulled through the second tube over a greater length. It may also be desirable to install in an existing tube a larger number of tubes with a smaller cross section than that of the existing tube if it is desired to use each of the smaller tubes as a separate guide or subduct for single- or multi-core copper or glass fiber cables. Further, it may be necessary to install in an existing tube a tube with a water barrier, so that in the existing tube, whose interior gradually fills up with water through diffusion, a waterproof conduit is created by means of the second tube, this waterproof conduit allowing the routing of cables without a water barrier. Such tubes with a water barrier may also have to be installed in existing water supply pipes if it is found that the water in the interior of the existing, slightly porous tube is subject to undue contamination by the surrounding groundwater. Finally, in tubes with a rough inside, a second tube with a smooth inside wall can be installed, so that the flow rate can increase in spite of the decrease of the total cross section. This is already being applied in sewer pipes and can also be applied in water supply pipes or gas or oil transmission lines.

To date, when installing tubes in existing tubes, either use is made of pulling techniques for pulling the new tube or tubes through the existing tube, or the "existing" tube is installed with the second tube or tubes already arranged therein. This last procedure is being applied especially in installing cable ducts having a number of subducts therein.

SUMMARY OF THE INVENTION

The first solution has as a drawback that in the existing tube first a pull cord has to be arranged, with which the later tube or tubes can subsequently be pulled in the existing tube, while the second solution is costly and little flexible, because the configuration of the subducts, once it has been chosen, cannot be changed afterwards anymore.

The object of the invention is to provide a method for installing a tube or bundle of tubes in an existing tube already present, without having to make use of pulling techniques, and which provides the possibility of installing a desired configuration of subducts at any time without high installation costs.

To that effect, the invention provides a method of the above-mentioned type, whereby the tube or tubes are passed into the existing tube by means of a fluid under pressure which is passed into the existing tube at the inlet end thereof.

The invention is based on the insight that it is possible to blow a tube or a bundle of tubes into an existing conduit using a fluid under pressure, for instance compressed air. Such a technique has already been in existence for a number of years for blowing cables into cable ducts, but heretofore the insight was lacking that the principle of the blowing technique can also be used advantageously in installing a tube or tubes in an existing tube. For the basics of blowing in cables of relatively great stiffness, reference is made to EP-A 0 292 037.

According to a first embodiment of the invention, the forward end of the tube or tubes to be installed is sealed and the forward end is connected to a guide means so as to be resistant to tensile strain, this guide means having substantially the same cross-sectional dimension as the interior of the existing tube. Such a guide means is known under the name of shuttle, which name will be used hereinafter. The advantage of the use of a shuttle is especially prominent when installing a tube or a bundle of tubes which are not to twist during installation. If the existing tube has one or more guide grooves on the inside or has a non-circular cross section, the shuttle can, respectively, be provided with means which engage in the grooves during the advancement of the shuttle or have a shape corresponding with that of the non-circular cross section. The shuttle can be "open", whereby the shuttle allows the pressurized fluid to pass and has solely a guiding function, but can also be semipermeable or closed. In the last-mentioned two cases, the fluid under pressure exerts a force on the shuttle, which is thereby advanced in the existing tube and also fulfils a function as pulling means. For a further discussion of the manner in which a semipermeable or closed shuttle functions, reference is made to EP-A-0 445 858.

According to a second exemplary embodiment of the invention, the feed-in end of the tube or tubes to be installed is open, so that (a part of) the pressurized fluid led into the existing tube can flow back via the inside of the tube or tubes to be installed. As a result, the fluid flowing along the external wall(s) of the tube or tubes to be installed, also in the case of a closed shuttle, has a higher velocity than the travelling speed of the tube or tubes through the existing tubes, so that a drag force is exerted on the external wall(s), which drag force can also be used to advantage when installing cables, as has been described with supporting calculations in EP-A-0 292 037. The method according to the second exemplary embodiment can be carried out with or without a shuttle.

According to a third embodiment, the end of the existing tube is closed and the feed-in end of the tube or tubes to be installed is open. Here, it is true, the closed end of the existing tube constitutes a "blocking" to the pressurized fluid, but the fluid can flow back via the interior of the tube or tubes to be installed, to the end thereof, for instance, in the case of a tube wound onto a reel, so that the fluid flowing in the closed tube still exerts a drag force on the tube to be installed. In this third exemplary embodiment, no closed or semipermeable shuttle is used, but optionally an open shuttle can be used which solely has a function as guide means. As will be further explained hereinbelow, in this installation method the maximum installation length is always achieved and the advantage exists that the existing tube need not be provided with openings at pre-calculated points during installation or afterwards, which is highly cost-saving.

In order to obviate the counterpressure arising at the feed-in end of the existing tube when introducing the tube or tubes to be installed, it is preferred that adjacent this feed-in end, means are arranged, for instance motor-driven pressure rollers, which are adapted, through engagement of the circumference of the tube or tubes to be installed, to lead the tube(s) over a first portion thereof into the existing tube. For a further explanation of this principle, again reference is made to EP-A-0 292 037. The principle of supplemental pushing during installation as described in this publication naturally can also be used in installing tubes.

BRIEF DESCRIPTION OF THE DRAWINGS

The invention will be further elucidated hereinafter on the basis of exemplary embodiments, with reference to the drawings, wherein:

FIG. 1 is a schematic side elevation, partly in cross section, of a first application of the method according to the invention;

FIG. 2 is a front view of the application according to FIG. 1 in an existing tube with a grooved inside;

FIG. 3 is a schematic side elevation, partly in cross section, of a second application of the method according to the invention;

In the figures, corresponding parts are designated with the same reference numerals.

DETAILED DESCRIPTION

Figure 5A:
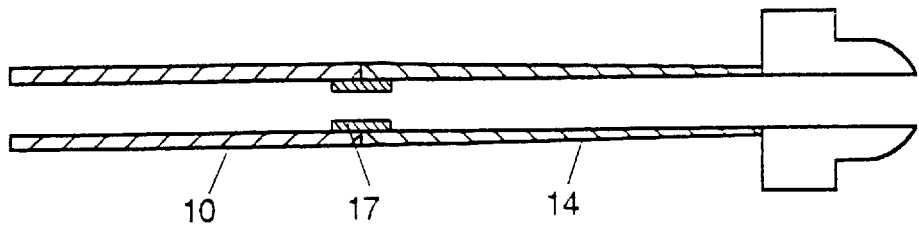
FIGS. 5a, b show a detail of an accessory for the free end of a tube which is installed with the method according to the invention.

The invention will be elucidated hereinafter on the basis of examples where tubes are installed which are intended to function as cable ducts. It is pointed out with emphasis, however, that the invention is applicable in installing tubes which are intended for a variety of applications, including water supply, sewerage, etc.

FIG. I shows an existing tube 1, in which it is desired to install a bundle of guide tubes 2, which are intended to function as cable duct. The ends of the tubes 2 are closed at the forward, feed-in end thereof, and using a pair of pressure rollers 3 driven by a motor (not shown) the bundle of tubes is led via a feed-in opening into a pressure space 4 into which also opens an inlet opening 5 for a fluid under pressure, for instance compressed air. Connected to the inlet opening 5 is a compressor (not shown). The free end of the bundle 2 yet to be routed is wound onto a reel, also not shown. The closed feed-in ends of the bundle 2 are connected to a pulling means or shuttle 6 so as to resist tensile strain and, if necessary, torsion.

Preferably, the inner wall of the tube 1 is provided with one or more grooves 7, as shown in FIG. 2, and on the circumference of the shuttle there are provided one or more guide means 8, which engage in the grooves and ensure that the shuttle 6 cannot twist in the tube 1, thereby preventing torsion of the bundle, which is highly undesirable because it renders more difficult the subsequent feed-in of cables into the individual tubes. The part of the bundle 2 wound onto the reel obviously will not twist.

FIG. 3 shows an embodiment in which the feed-in end of a tube 10 to be installed is not closed off. FIG. 3 shows a single tube to be installed, but the principle is straightforwardly applicable to a bundle of tubes each of which or a number of which have an open forward end. The compressed air can now flow even faster along the outer wall of the tube 10 than it would if the tube 10 were closed. Now, even with a closed shuttle, the velocity of the air is always greater than the velocity at which the tube 10 is pulled forth through the tube 1 by means of the shuttle 6. Thus an additional drag force is exerted on the outside of the tube 10, so that, given the same pressure of the compressed air, the tube 10 can be introduced farther than if the end of the tube 10 is closed. The additional drag effect obtained in case of a closed shuttle is comparable with that which can be obtained when installing cables if the shuttle 6 is semipermeable, that is, it has one or more passages for the compressed air. The application of such a semipermeable shuttle for installing cables and a calculation of the additional drag effect obtained are described in EP-A-0 445 858. Compared with the use of a semipermeable shuttle, the use of a tube with an open forward end has the advantage that the ratio between the part of the air stream that energizes the shuttle and the part that determines a drag force over the length of the tube now regulates itself automatically in a favorable manner without necessitating a semipermeable shuttle with a variable opening, as described in the aforementioned patent application. The dimension of the tube 10 to be installed, through which the air can flow back, is in fact the only factor determining the flow resistance after the shuttle. This flow resistance is constant. When the tube 10 is being installed, first the complete air pressure will be exerted on the shuttle 6, since the flow resistance over the entire reel-wound length of the tube 10 through which the air flows back is much greater than the flow resistance of the part of the tube 1 filled with the tube 10, through which the air flows in the forward direction. If the tube 10 is installed farther, the flow resistance in the forward direction will increase, while that in the backward direction remains constant. The total flow resistance therefore increases, which is the case at least to a lesser extent with a semipermeable shuttle. The tensile force exerted on the shuttle 6 by the compressed air will therefore be at a minimum if the tube 10 to be installed has reached the end of the tube 1 in which it is being installed. The drag force, by contrast, is then at a maximum. This is the optimum situation for realizing a maximum installation distance. Owing to the circumstance that initially the complete pressure acts on the shuttle and then decreases gradually, the mechanical propulsion for leading the tube into the pressure space is, in principle, not necessary. The above-described method is favorable for overcoming the so-called critical point as the tube is being blown in, as elucidated extensively in EP-A-0 292 037.

The foregoing can be further elucidated on the basis of the following calculation. For a proper understanding, it is supposed that a cable is being blown into a cable duct as described in EP-A-0 292 037. The force exerted on such a cable is defined as $$dF = \frac{\pi D_c D_d}{4} dp \quad (1)$$

wherein $D_c$=cable diameter; $D_d$=duct diameter and dp= pressure gradient. The force dF is made up of two parts, a hydrostatic force and a hydrodynamic force. The firstmentioned force is determined by the pressure difference over the cross section of the cable and must be supplied mechanically at the point where the cable is introduced into the pressure space. This can be done using mechanically driven press-on rollers such as the rollers 3 in FIG. 3.

If use is made of a semipermeable shuttle, the above also applies, but the pressure gradients that occur will be smaller, because the semipermeable shuttle decelerates the air stream. At the location of the shuttle, now a local tensile force is present too, which is equal to the pressure difference across the shuttle multiplied by the cross section of the shuttle, likewise having a diameter $D_d$.

When installing a tube 10 with an external diameter $D_c$, as shown in FIG. 3, the following applies. When the tube 10 is closed off at the forward end, the air stream will exert on the tube the same force as in the case of a cable. However, when the feed-in end of the tube 10 is left open, the air stream can flow back through the tube 10 to the likewise open rearward end of the tube 10, which is wound onto a reel. Now, therefore, in the case of a closed shuttle too, an air flow along the outer wall of the tube 10 can arise, which has a higher velocity than the travelling speed of the tube 10, which gives rise to drag forces. The force exerted on the shuttle is again the pressure difference across the shuttle, multiplied by the cross section of the shuttle, but now augmented with a force following from the change of impulse of the air stream reversing its direction. The last-mentioned force is defined by:

$$F_{\Delta\upsilon} = \rho \Phi_\upsilon \Delta\upsilon \qquad (2)$$

where $\Phi_\upsilon$ the volume flow; $\rho$=density and $\Delta\upsilon$=absolute velocity change of the flowing medium. A derivation of this formula can be found in "Fluid mechanics" by V. L. Streeter, McGraw-Hill, student edition, New York. It is of importance to note that the air stream returning through the tube 10 does not give any additional drag forces acting in the opposite direction. In fact, the drag forces in the tube 10, integrated over the entire length of the tube, equal the pressure difference across the tube 10 multiplied by the cross section of the tube 10. When installing a tube with a closed end, the same force acts on the sealed feed-in end of the tube. There, this force, in the same manner as when installing a cable, yielded a force which is compensated on the feed-in side by the mechanical force produced by the press-on roller. Such forces on a cable or a (closed) tube have no influence on the installation of the cable or tube and hence none on the installation of an open tube either. For a detailed discussion of this effect, reference is made to the book entitled "Installation of optical cables in ducts" by W. Griffioen, Plumettaz, Bex (CH), 1993.

Figure 4B:
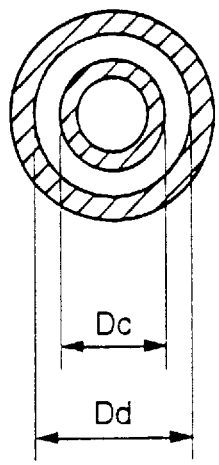
FIGS. 4a, b show a schematic side elevation, partly in cross section, of a third application of the method according to the invention.
Figure 4A:
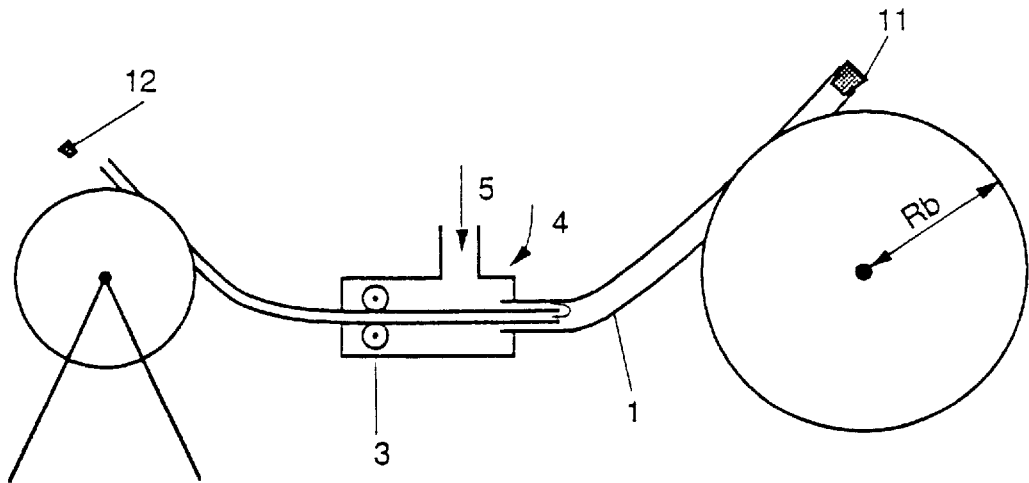

FIG. 4a shows in what way a tube 10 can be installed in an existing tube 1 which is closed at the end, using a fluid under pressure, preferably compressed air. The advantage is that when installing the inner tube no digging work is necessary to open the end of the existing tube when the inner tube or inner tubes are installed at a later stage and that the tube lengths to be installed and the associated openings in the existing tube need not be calculated because the maximum achievable length to be installed, independently of the actual length of the closed tube, is always achieved. This will be elucidated below on the basis of an example.

A tube 10 with an external and internal diameter of 5 and 3.5 mm ($D_c$=5 mm), respectively, is installed in a tube 1 with an external and internal diameter of 8 and 6 mm ($D_d$=6 mm), respectively, as shown in FIG. 4b. In this case the flow resistance of the space between the two tubes is greater than that of the space within the inner tube, since the surface area of the cross section of the first-mentioned space is smaller, while the "wetted surface" is greater. The ⅝ mm tube 1 is disposed on a reel 13 of a diameter of 1 m ($R_b$=0.5 m), as shown in FIG. 4b. The other parameters for the tube 10 to be installed are a weight W =0.1 N/m and a stiffness B=0.005 Nm². The coefficient of friction f=0.2. The installation unit is as described in EP-A-0 292 037.

First, the situation is considered where both tubes are closed off, for instance with corks 11 and 12, as shown in FIG. 4a. It is assumed that the compressor which is connected to the pressure chamber supplies an absolute air pressure pi of 9 bar, while the atmospheric pressure $P_a$=1 bar. Upon switch-on of the compressor, both tubes will fill up with air. When this has taken place, there will be no more air flow. The only force left to install the tube is the pushing force supplied by the installation unit. This pushing force F is set at 100 N, excluding the force of 16 N needed to introduce the tube into the pressure space. The force build-up during pushing is formed by the mass of the tube to be installed, the pressing of this tube against the wall in the bends and the upsetting by the pushing. The last contribution is small because one tube fits closely within the other. The formula for pulling in a tube therefore gives a good approximation and in any case the maximum of the length installable in this way. This formula reads:

$$F = WR_b \sinh(f\theta) \qquad (3)$$

Where $\theta$ is the angle through which the tube has been installed in the bend. With the aid of (3) it can be calculated that the installing length is 6.6×360° at a maximum, which corresponds with 21 m tube length. For a derivation of formula (3), reference is made to the above mentioned book entitled "Installation of optical cables in ducts" by W. Griffioen. Although the above formula (3) applies to a horizontally arranged reel, the result is virtually the same for a vertically arranged reel as shown in the figure.

If the cork 12 is removed, an air flow through the inner tube will arise and drag forces start to act on this tube. Only the forward air flow between the two tubes has any influence on the propulsion of the inner tube to be installed. The forces produced by the backflow through the inner tube are taken up as a depression of the material of this tube. The inner tube will be blown in increasingly farther. While this happens, after the air stream has achieved a semistationary condition, the pressure gradient across the space between the tubes becomes increasingly smaller. The total pressure drop across this space, on the other hand, can increase because the flow resistance over this space becomes increasingly greater, given an equal flow resistance of the inside of the tube to be installed, which has a constant length, but the length of the tube to be installed over which this pressure prevails becomes increasingly greater. AS is described in the above mentioned book by W. Griffioen, in the blowing operation the pressure drop per unit of length is of importance. Thus the maximum length is achieved at the moment when the pressure drop per unit of length is so small that the friction resulting from the cable weight can no longer be overcome. Owing to the compressible nature of air stream, the pressure drop dp/dx will be smallest at the location of the installation unit:

$$\frac{dp}{dx} = \frac{p_i^2 - p_s^2}{2lp_i} \qquad (4)$$

Formula (4) no longer includes the atmospheric pressure $P_a$, but instead includes the pressure $p_s$. In other words, the pressure at the forward end of the tube to be installed is higher than the atmospheric pressure because a flow resistance for the backflow is to be bridged as well. If in this example $p_s$ is set to equal 5 bar, the installation length can be calculated by setting the blowing force to be equal to the frictional force:

$$\frac{\pi}{4} D_c D_d \frac{dp}{dx} = fW \qquad (5)$$

It can be calculated that, independently of the length of tube 1, a length of 367 m can be spanned by blowing and in practice even somewhat more because the installation unit further exerts an additional pushing force.

Accordingly, the above clearly shows the importance of the backflow. The installation length is improved from less than 21 m to more than 367 m.

Figure 5B:
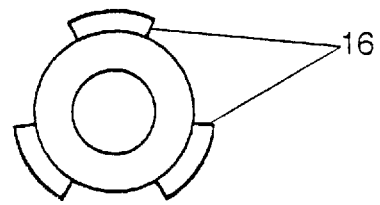

FIG. 5a shows schematically in what way the forward end of the tube 10 to be installed, in the case of installation in an existing tube with a closed end, can be provided with an accessory 14, which has a tapering configuration, preferably has a bending stiffness decreasing towards the free end and is preferably rounded at the free end. The accessory 14, which is connected to the tube 10 through a coupling element 17, serves to facilitate negotiating bends in the existing tube. To prevent the tube to be installed in the existing tube from "rattling" during installation, the forward end of the accessory 14 can be provided with guide means 16, as shown in FIG. 5b.

Figure 6A:
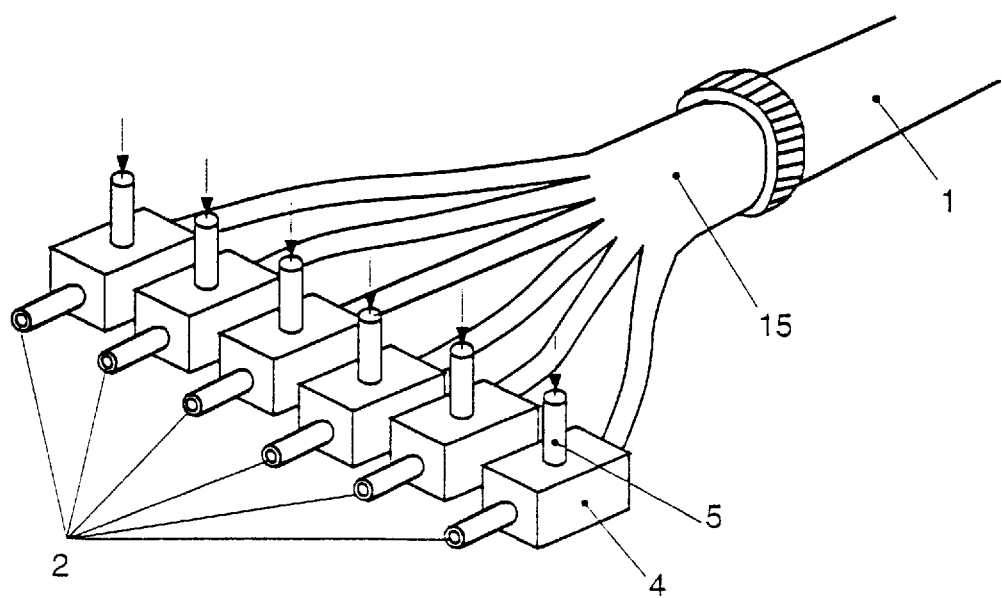
FIGS. 6a, b, c show a schematic perspective view of the simultaneous feed-in of a number of tubes into an existing tube.

FIGS. 6a, b and c show in what way a bundle of tubes can be introduced into a single existing tube.

According to FIG. 6a the tubes 2 to be installed are each fed, via their own pressure chamber 4 each connected to a respective source of compressed air, to a connecting nozzle 15 with as many inlets as there are tubes and with one outlet which is coupled to the existing tube 1.

Figure 6B:
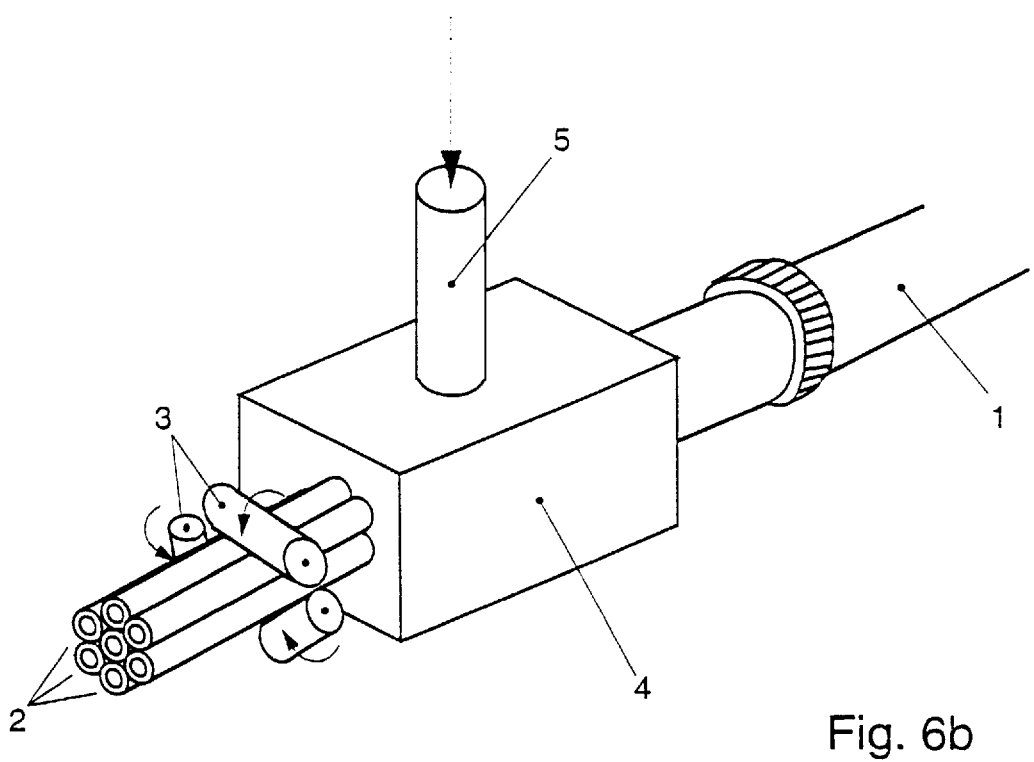

FIG. 6b shows a situation where the tubes 2, already bundled, are fed via a single pressure chamber 4 into the tube 1, the bundle being optionally provided with its own envelope.

FIG. 6c, finally, shows the installation of the tubes 2 as a flat ribbon, via a single pressure chamber with adapted, wide pressure rollers 3. If desired, such as flat ribbon, before being introduced into the tube, can be folded into a round bundle of tubes. This provides an advantage in that, given a particular tube diameter, more tubes can be placed.

For the sake of completeness, it is further noted that the invention is suitable not only for installing a bundle of tubes without contents but also for installing tubes in which an elongate element, such as another tube, or a telecommunication cable, such as a copper cable or an optical fiber, or a power cable or the like, has been arranged beforehand. However, care should be taken here that between the inner wall of the tubes and the outer wall of the elongate element previously arranged therein, enough space is left to enable the return flow of the fluid used for installation.

I claim:

1. A method for installing a tube or a bundle of tubes into an existing tube, comprising:

introducing a fluid under pressure into the existing tube at an inlet end thereof, and feeding the tube or bundle of tubes into the existing tube through the inlet end thereof;

wherein a forward end of the tube or at least one of the tubes to be installed is open, so that at least a part of the fluid under pressure introduced into the existing tube flows back via an interior of the tube or tubes to be installed.

2. A method according to claim 1, wherein the forward end of the tube or tubes to be installed is connected to a guide means which has substantially the same cross-sectional dimension as an interior of the existing tube, and wherein the guide means is brought into the inlet end of the existing tube.

3. A method according to claim 2, wherein the guide means comprises pulling means.

4. A method according to claim 2, wherein:

the existing tube has at least one of: (i) at least one guide groove on the interior thereof, and (ii) a non-circular cross section; and the guide means at least one of: (i) engages in said at least one groove during travel of the guide means, and (ii) has a shape corresponding with the non-circular cross section of the existing tube after "tube".

5. A method according to claim 4, wherein the guide means comprises pulling means.

6. A method according to claim 1, wherein the forward end of the tube or tubes to be installed is connected to a pulling means so as to resist tensile strain, said pulling means pulling the tube or tubes through the existing tube and said pulling means having substantially the same cross-sectional dimension as an interior of the existing tube.

7. A method according to claim 1, wherein, in the case of installing a bundle of tubes, the tubes in the bundle are disposed next to each other in a plane.

8. A method according to claim 1, wherein, in the case of installing a bundle of tubes, the tubes in the bundle are packed together into a circular shape.

9. A method according to claim 8, wherein an envelope is arranged around the bundle of tubes.

10. A method according to claim 1, further comprising providing driven press-on rollers for engaging a circumference of the tube or tubes to be installed adjacent to the inlet end of the existing tube.

11. A method for installing a tube or a bundle of tubes in an existing tube, comprising:

connecting a forward end of the tube or tubes to be installed to a shuttle so as to be resistant to tensile strain, said shuttle having substantially the same cross-sectional dimension as an interior of the existing tube;

bringing the shuttle into an inlet end of the existing tube; and introducing a fluid under pressure into the existing tube at an inlet end thereof and against the shuttle to cause the shuttle to move along the existing tube, wherein the forward end of the tube or at least one of the tubes to be installed is open, so that at least a part of the fluid under pressure introduced into the existing tube flows back via an interior of the tube or tubes to be installed.

12. A method according to claim 11, wherein the shuttle is semi-permeable with respect to the fluid under pressure.

13. A method according to claim 11, wherein the shuttle is impermeable with respect to the fluid under pressure.

14. A method for installing a tube or a bundle of tubes into an existing tube, comprising:

introducing a fluid under pressure into the existing tube at an inlet end thereof, and feeding the tube or bundle of tubes into the existing tube through the inlet end thereof;

wherein an end of the existing tube, opposite the inlet end of the existing tube is closed, and wherein a forward end of the tube or at least one of the tubes to be installed is open, so that the fluid under pressure introduced into the existing tube flows back via an interior of the tube or tubes to be installed.

15. A method according to claim 14, wherein the forward end of the tube or tubes to be installed is connected to a guide means which has substantially the same cross-sectional dimension as an interior of the existing tube, and wherein the guide means is brought into the inlet end of the existing tube and guides the tube or tubes therethrough.

16. A method according to claim 15, wherein:

the existing tube has at least one of: (i) at least one guide groove on the interior thereof, and (ii) a non-circular cross section; and the guide means at least one of: (i) engages in said at least one groove during travel of the guide means, and (ii) has a shape corresponding with the non-circular cross section of the existing tube.

* * * * *